Oct. 30, 1934.  J. A. WRAY  1,979,239
EQUALIZED MULTIPLE BEARING SWIVEL
Filed Feb. 9, 1934  3 Sheets-Sheet 3
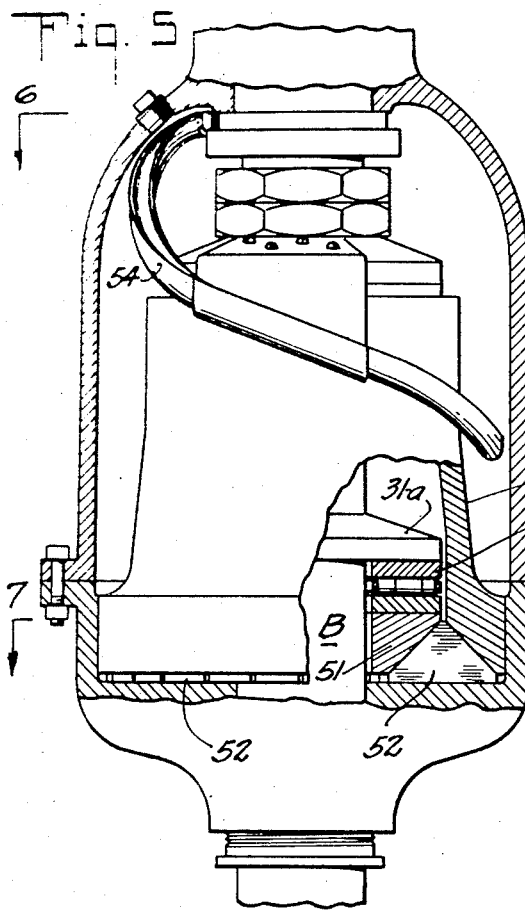
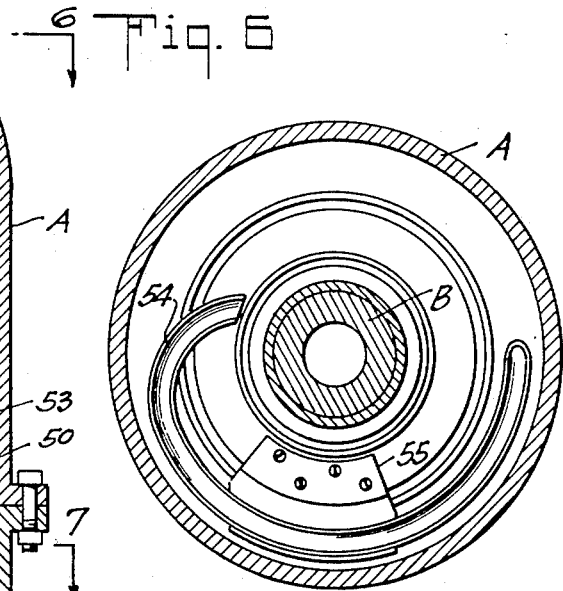
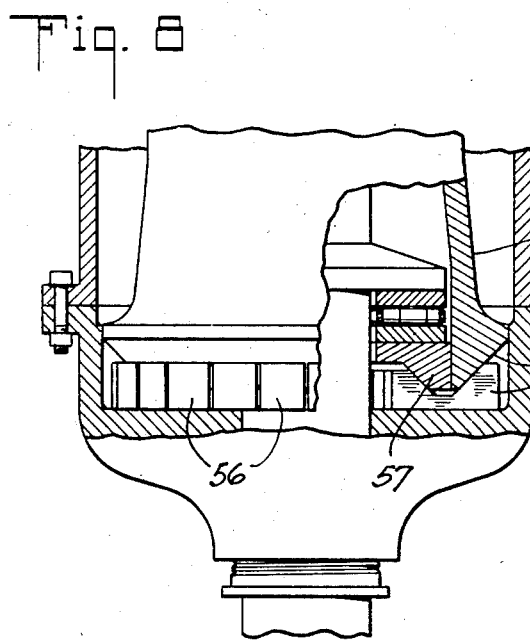
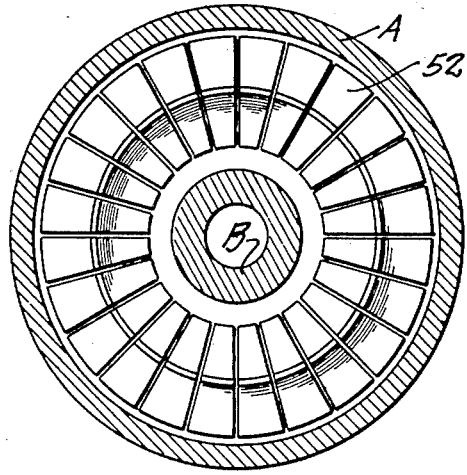
INVENTOR
James A. Wray
BY Westall and Wallace
ATTORNEYS Patented Oct. 30, 1934

1,979,239

UNITED STATES PATENT OFFICE 1,979,239

EQUALIZED MULTIPLE BEARING SWIVEL

James A. Wray, Los Angeles, Calif.

Application February 9, 1934, Serial No. 710,541

1 Claim. (Cl. 308—160)

This invention relates to hydraulic swivels such as are commonly used in rotary hydraulic drilling of well holes, and pertains more especially to a multiple bearing construction whereby the load of the drill string is transferred from the swivel stem to the trunnion block. The present invention concerns itself with mechanical equalizing means to distribute the load between bearings to accommodate them to variations in the load and to insure desired distribution with inaccuracies and variations in bearing spacing.

The primary object of this invention is to provide automatic equalizing means whereby movement of an element of one bearing due to load is inversely transmitted in part to a corresponding element of another bearing.

These objects together with other objects as will appear from the subjoined specification are obtained by the embodiments of the invention shown in the accompanying drawings, in which:—

Figure 1:
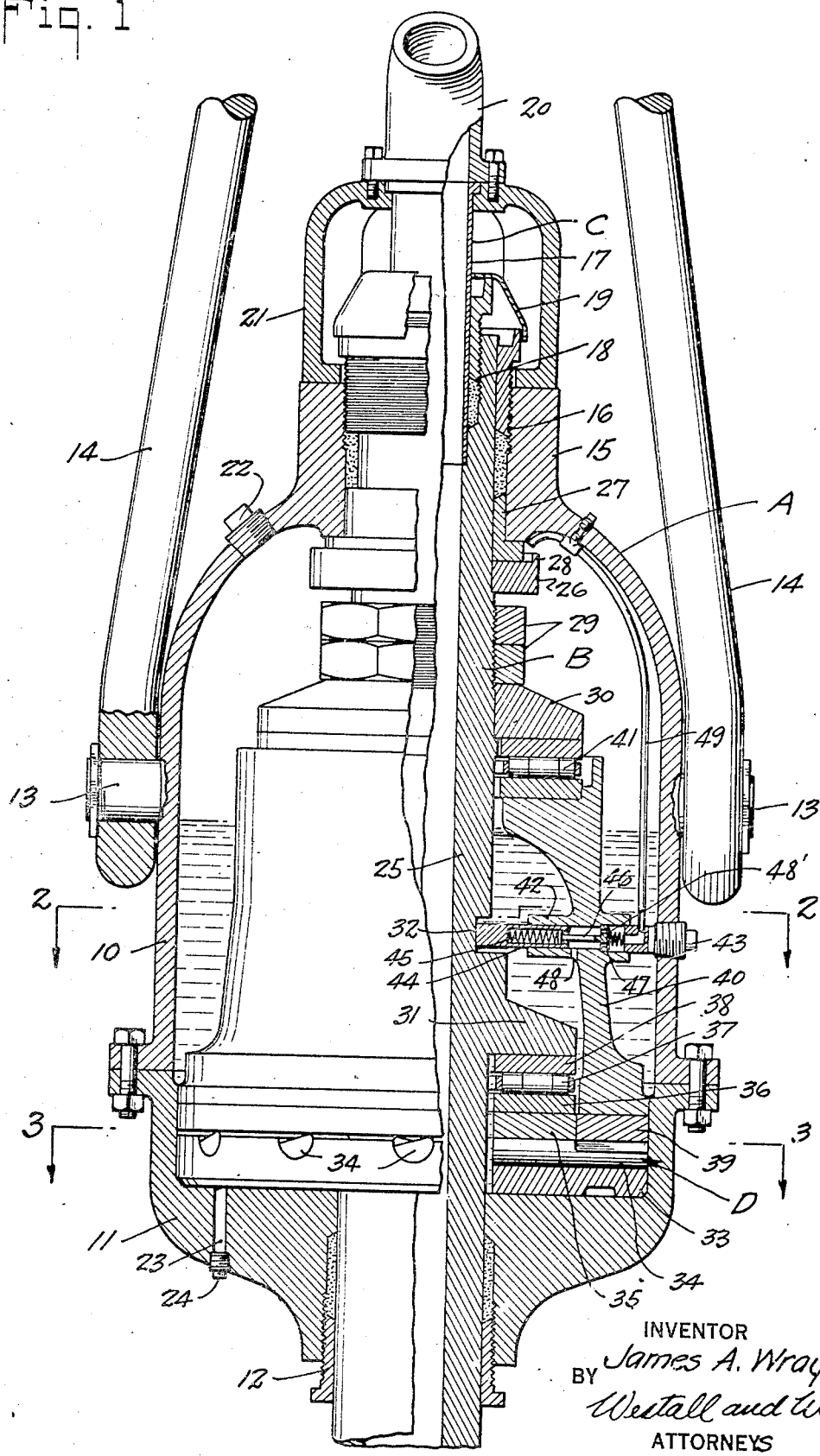
Figure 2:
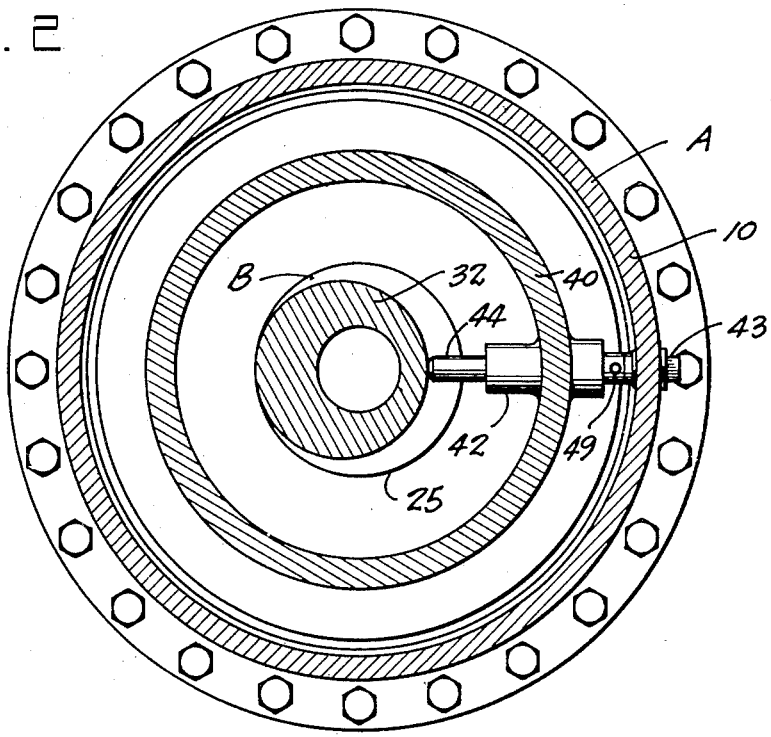
Figure 3:
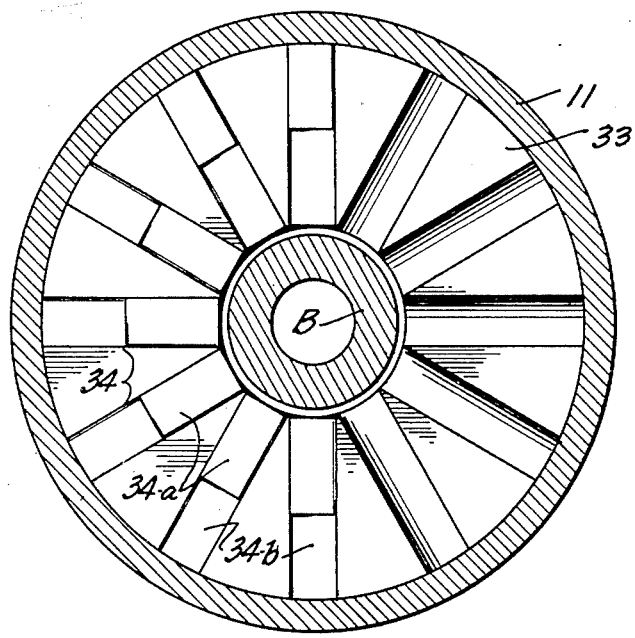
Figure 4:
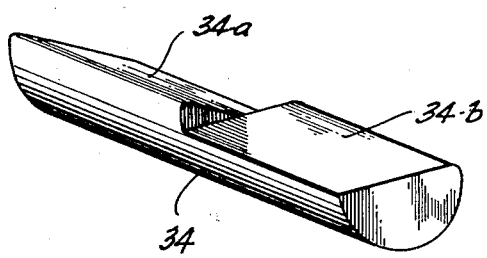

Fig. 1 is an elevational view partly in section of one species of a swivel; Figs. 2 and 3 are sections as seen on the lines correspondingly numbered in Fig. 1; Fig. 4 is a perspective view of a seesaw roller; Fig. 5 is an elevational view partly in section of another species of swivel; Figs. 6 and 7 are sections as seen on the lines correspondingly numbered in Fig. 5; and Fig. 8 is a view in elevation and section of a fragment of another species.

Referring more particularly to Figs. 1 to 4, the swivel comprises a trunnion block A adapted to be supported by suitable bails. Disposed in and supported by the trunnion block upon thrust bearings is a swivel stem B. Rotatably disposed within the swivel stem is a hose stem C adapted to be connected to the discharge line from a mud or circulation pump. The seesaw equalizing mechanism is indicated generally by D.

The trunnion block is in the form of a case comprising a shell 10 to which a head 11 is bolted, the head being provided with a packing box structure 12 of any suitable nature. Trunnions 13 extend laterally from the shell and receive the ends of the usual bail or clevis 14. The trunnion block has a neck 15 and is provided with a bore having a suitable packing box 16 to accommodate the upper end of the swivel stem. The hose stem has a tubular portion 17 rotatively extending into the swivel stem and a packing box 18 between the hose stem and the swivel stem is provided. A petticoat 19 is shown covering the outer end of the packing box. Secured to the tubular member 17 and forming a part of the hose stem is the conventional goose neck 20 and a cap 21 is secured to the goose neck and shields the packing member at the upper part of the trunnion block neck 15. As the trunnion block forms a case for oil, a filling opening is provided and closed by a plug 22. In the head 11 is a drain port 23 closed by a plug 24.

The swivel stem comprises the tubular member 25 upon which a shoulder is formed to seat a ring disk 26 abutting and supporting the gland member 27 and provided with a flange 28 to form an oil channel whereby oil may be supplied to the swivel stem packing. Below the disk 26, the swivel stem is threaded to receive nuts 29 and supports a bearing table 30. Below bearing table 30 and formed integral with the swivel stem is a bearing table 31 and intermediate the tables 30 and 31 the swivel stem is cut away to form a cam 32. The table 30 is normally fixed in relation to the swivel stem, but may be adjusted longitudinally on the swivel stem to change its distance in relation to the table 31.

A plate 33 rests upon the head 11 and is free to turn thereon. Formed in the plate 33 and extending radially are half round channels to receive seesaw rockers. The seesaw rockers 34 have flat faces 34a and 34b disposed at angles to one another. With the seesaw rockers disposed in the channels of plate 33 their inner flat faces 34a support a plate ring 35 and the latter in turn supports a thrust race 36. Rollers 37 rest upon race 36 and interposed between the table 31 and rollers 37 is a race 38. The construction is such that the head serves as a step for the thrust bearing and portion of a seesaw mechanism is interposed between the table 31 and the step. Another ring 39 rests upon the outer faces 34b of the seesaw rocker. Resting upon the ring 39 is a column 40 which forms a shell and has a ledge supporting the lower race of a roller bearing 41 interposed between the table 30 and the column.

The construction is such that when a load is placed upon the swivel stem, the tables 30 and 31 will bear down upon the roller bearings which form a part of the thrust bearings. A load on the lower table 31 will tend to tilt the seesaw rockers 34 and raise the column 40 thereby raising the bearings 41 and transferring a portion of the pressure to the upper table 30. There is a mutual action between the bearings by reason of the equalizing mechanism, the seesaw mechanism acting as a load transmitter.

In order to lubricate the bearings, the column 40 has been provided with a boss 42 forming a pump barrel accessible through an opening in the trunnion box closed by plug 43. In the plunger barrel is a plunger 44 engaging the cam 32 and held in such engagement by a compression spring 45 disposed within a socket in the plunger. One end of the compression spring 45 bears upon the head of a stem 46. A ported spider 47 is at the other end of the stem and a disk valve 48 is mounted thereon. An intake port 48 is disposed so as to be overrun by the plunger 44 which delivers oil through the check valve 48' to tubing 49 and by way of the tubing to the channel in disk 26. The plunger is operated by rotation of the swivel stem and surplus oil in the channel of disk 26 will overflow and run downwardly to lubricate the upper bearing 41 and then back to the lower part of the casing.

Referring more particularly to Figs. 5, 6, and 7, a swivel block A of the same general construction as before described is shown and mounted therein in the swivel stem B. The hose stem, not shown, is connected to the swivel stem as in the structure shown in Fig. 1. The swivel stem is of a construction like that shown in Fig. 1 except that the cam 32 is omitted. However, it has an upper table and a lower table marked 31a. These tables are identical with the table shown in Fig. 1. Below the table 31a is a roller bearing 50 supported upon a ring 51 having an outer circumferential inclined face. The ring 51 rests upon blocks 52 which are in radial section substantially triangular. The blocks 52 may slide upon the step formed by the head. These slip blocks 52 are arranged side by side in circular formation with sufficient clearance between blocks to permit their circular expansion and contraction as a group. Resting upon the outer inclined faces of blocks 52 is the column 53 having an inner inclined face at its lower end. The upper end supports the upper thrust bearing in the same manner as in the construction shown in Fig. 1. A seesaw arrangement is thus provided. When the bearing 50 moves downwardly, the column is moved upwardly and vice versa. In order to provide lubricant for the upper packing box and upper bearing, I have provided a screw type of pump consisting of a flute trough of helical form and marked 54. This trough is secured by bracket 55 to the upper table of the swivel stem. In the rotation of the swivel stem within the trunnion block 8a the trough 54 will scoop oil and cause it to travel upwardly where it is delivered at the same point as the tubing 49 delivers oil in the construction shown in Fig. 1.

In Fig. 8 a variation of the seesaw structure shown in Fig. 7 is disclosed. The case A carries on the step formed by its head a number of slip blocks, 56. Recesses are formed in the blocks, so that when the latter are arranged in annular formation, an annular channel having sloping sides is provided. Resting in this channel is a ring 57 supporting the bearing beneath the lower table. The column 58 has a sloping face on its lower end as indicated by 59 and is adapted to rest within the annular channel formed by the blocks. The construction is such that upon a downward movement of the lower bearing, the column 58 will be raised in the reverse direction resulting in an inverse movement of the bearing supporting the upper table.

What I claim is:—

In a swivel thrust bearing, a case member, a stem member slidably extending through said case member, said members having a plurality of thrust bearings therebetween; load equalizing means connecting said bearings, thrust tables on one of said members longitudinally fixed against longitudinal movement, coacting thrust bearing members longitudinally movable, a step on said case member: said equalizing means comprising a pressure transmitter including a column supporting one of said thrust bearing members and a seesaw rocker having longitudinally spaced bearing faces with a bearing face interposed between a thrust bearing member and said step and its other bearing face supporting said column whereby to equalize the load between bearings.

JAMES A. WRAY.